(12) United States Patent
Hosoi et al.

(10) Patent No.: US 7,777,163 B2
(45) Date of Patent: Aug. 17, 2010

(54) INDUCTION HEATING COOKING APPARATUS

(75) Inventors: Kouichi Hosoi, Hyogo (JP); Kazuichi Okada, Hyogo (JP)

(73) Assignee: Panasonic Corporation, Osaka (JP)

( * ) Notice: Subject to any disclaimer, the term of this patent is extended or adjusted under 35 U.S.C. 154(b) by 740 days.

(21) Appl. No.: 11/571,359

(22) PCT Filed: Aug. 24, 2005

(86) PCT No.: PCT/JP2005/015311
§ 371 (c)(1),
(2), (4) Date: Dec. 28, 2006

(87) PCT Pub. No.: WO2006/022275
PCT Pub. Date: Mar. 2, 2006

(65) Prior Publication Data
US 2008/0017633 A1      Jan. 24, 2008

(30) Foreign Application Priority Data
Aug. 25, 2004   (JP)  ............................. 2004-245581

(51) Int. Cl.
*H05B 6/12* (2006.01)
(52) U.S. Cl. ...................................... 219/624; 219/625
(58) Field of Classification Search ......... 219/621–627, 219/653, 664, 665, 675, 468.2, 453.11, 618
See application file for complete search history.

(56) References Cited
U.S. PATENT DOCUMENTS
3,085,142 A  * 4/1963 Baermann ................... 219/622

(Continued)

FOREIGN PATENT DOCUMENTS
JP          04366588 A  * 12/1992

(Continued)

OTHER PUBLICATIONS

Microfilm of the specification and drawings annexed to the request of Japanese Utility Model Application No. 58185/1983 (Laid-open No. 164189/1984) (Matsushita Electric Industrial Co., Ltd.), Nov. 2, 1984, Description, p. 4, line 20 to p. 5, line 3.

(Continued)

*Primary Examiner*—Tu B Hoang
*Assistant Examiner*—Hemant Mathew
(74) *Attorney, Agent, or Firm*—Pearne & Gordon LLP

(57)        ABSTRACT

An induction heating cooking apparatus includes a top plate on which a cooking pot is placed, a coil, an inverter board, a supporting bed, a board holder and elastic bodies. The coil induction-heats the cooking pot. The inverter board is mounted with components for driving the heating coil. The supporting bed is disposed above the inverter board and supports the heating coil. The supporting bed is provided with a push-up boss, and is pushed upward to the top plate via the push-up boss. The board holder is provided with three or more number of support bosses, and holds the inverter board. Each of the elastic bodies intervenes between the supporting bed and one of the support bosses. The supporting bed is provided with first slide restricting sections, while each support boss with a second slide restricting section. The first and the second slide restricting sections, which make contact to each other, restrict a sliding distance of the supporting bed so as it is smaller than the minimum value of a gap between the bottom plane of supporting bed and the top surface of the component.

11 Claims, 6 Drawing Sheets

U.S. PATENT DOCUMENTS

| | | | |
|---|---|---|---|
| 3,746,837 A | * | 7/1973 | Frey et al. .................... 219/387 |
| 3,898,430 A | * | 8/1975 | Sego et al. ............. 219/453.11 |
| 4,092,511 A | * | 5/1978 | Austin ........................ 219/624 |
| 4,351,996 A | * | 9/1982 | Kondo et al. ................ 219/625 |
| 2002/0117497 A1 | * | 8/2002 | Bassill et al. ............... 219/626 |
| 2004/0245244 A1 | * | 12/2004 | Hirota et al. ................ 219/624 |
| 2005/0184061 A1 | * | 8/2005 | Nishinomiya et al. ....... 219/653 |

FOREIGN PATENT DOCUMENTS

| | | | |
|---|---|---|---|
| JP | 09-312195 | | 12/1997 |
| JP | 9-312195 | | 12/1997 |
| JP | 09312195 A | * | 12/1997 |
| JP | 11-87041 | | 3/1999 |
| JP | 11087041 A | * | 3/1999 |
| JP | 2000-348856 | | 12/2000 |
| JP | 2000-348856 A | | 12/2000 |
| JP | 2000348856 A | * | 12/2000 |
| JP | 2004-103445 | | 4/2004 |

OTHER PUBLICATIONS

European Search Report Dated Sep. 20, 2007.

Chinese Office Action.

* cited by examiner

PRIOR ART

INDUCTION HEATING COOKING APPARATUS

This application is a U.S. national phase application of PCT International application PCT/JP2005/015311.

TECHNICAL FIELD

The present invention relates to an induction heating cooking apparatus which includes a heating coil and an inverter board.

BACKGROUND ART

A conventional induction heating cooking apparatus is disclosed in, for example, Japanese Patent Unexamined Publication No. H9-312195. FIG. 12 shows the structure between a heating coil and an inverter board in a conventional induction heating cooking apparatus. Top plate 1 for placing a cook pot, etc thereon is made of a ceramic plate or the like material. Disposed underneath top plate 1 is coil 2 for generating a line of magnetic force for induction-heating a cook pot. Coil 2 is mounted fixed on supporting bed 3. Inverter board 4 for supplying high frequency current to drive coil 2 is disposed underneath supporting bed 3. Inverter board 4 is held on board holder 5.

Board holder 5 is provided with a plurality of support bosses 6 for holding supporting bed 3. Elastic body 7 composed of a coil spring is provided at support boss 6, with the boss' column formed at the center inserted in the coil spring. Holding section 8 is integrally formed at the outer circumference of supporting bed 3. It has a cylindrical shape with one end open towards down, and disposed to cover the upper end of elastic body 7. Supporting bed 3 is held by these parts. Supporting bed 3 is further provided with a plurality of push-up bosses 9 located on holding section 8. Push-up boss 9 is pushed upward by elastic body 7 until it reaches the reverse surface of top plate 1. This structure keeps the gap between coil 2 and top plate 1 constant. The up-down sliding distance A of supporting bed 3 is dependent on the shape and the spring force of elastic body 7. The distance A is required never to be smaller than the minimum value of a gap B between bottom plane 10 of the supporting bed and top surface 11 of the electronic components.

When a cooking apparatus of the above-described conventional structure in the packaged state is dropped by mistake, the apparatus itself is hit by an impact force. Here, supporting bed 3 which supports coil 2 is held by elastic body 7. Thus, the elastic body is compressed downward allowing the supporting bed 3 to slide down. In such an occasion, supporting bed 3 is pushed down until it makes contact with top surface 11 of electronic components mounted on inverter board 4. Thus the electronic components undergo a stress, and inverter board 4 may also be damaged together with the components.

In order to protect the electronic components from the stress, the minimum value of the gap B between bottom plane 10 of the supporting bed and top surface 11 of the electronic components is made large, or the spring force of elastic body 7 is made stronger in the conventional structure. When the minimum value of the gap B is increased, the electronic components can not be mounted at high density within a space in the apparatus, which results in a greater overall height with finished apparatus. This is unacceptable in view of the prevailing product trends for the smaller and the slimmer design. On the other hand, when the spring force of elastic body 7 is increased by modifying the material or the shape of elastic body 7, the impact force to be given to top plate 1 by push-boss 9 increases. This means a greater possibility of damage on top plate 1 because of greater impact to top plate 1 when the apparatus in the packaged state is dropped.

SUMMARY OF THE INVENTION

The present invention aims to offer an induction heating cooking apparatus in a configuration that enables a slim contour and yet tough enough to withstand an impact force incurred by, for example, a dropping, while ensuring a high reliability.

The induction heating cooking apparatus in the present invention includes a top plate on which a cook pot is placed, a coil, an inverter board, a supporting bed, a board holder, and elastic bodies. The coil heats the cooking pot by means of induction heating. The inverter board is mounted with components needed for driving the heating coil. The supporting bed is disposed above the inverter board and supports the heating coil. The supporting bed is provided a push-up boss thereon, and is pushed upward to the top plate via the push-up boss. The board holder is provided with three or more number of support bosses configured to hold the supporting bed, and holds the inverter board. Each of the elastic bodies intervenes in between the supporting bed and one of the support bosses. The supporting bed is provided with first slide restricting sections, while each of the support bosses is provided with a second slide restricting section. The first slide restricting section and the second slide restricting section make contact to each other in order to limit a sliding distance of the supporting bed to be smaller than the minimum value of a gap between the bottom plane of supporting bed and the top surface of the components. Thereby, even if the elastic body is compressed and the supporting bed is pushed down, it never collides with the components mounted on the inverter board. Thus, an induction heating cooking apparatus designed slim in accordance with the present invention would not get damaged easily even if it is exposed to an impact force caused by a dropping, and ensures a high reliability.

DETAILED DESCRIPTION OF PREFERRED EMBODIMENTS

Figure 1:
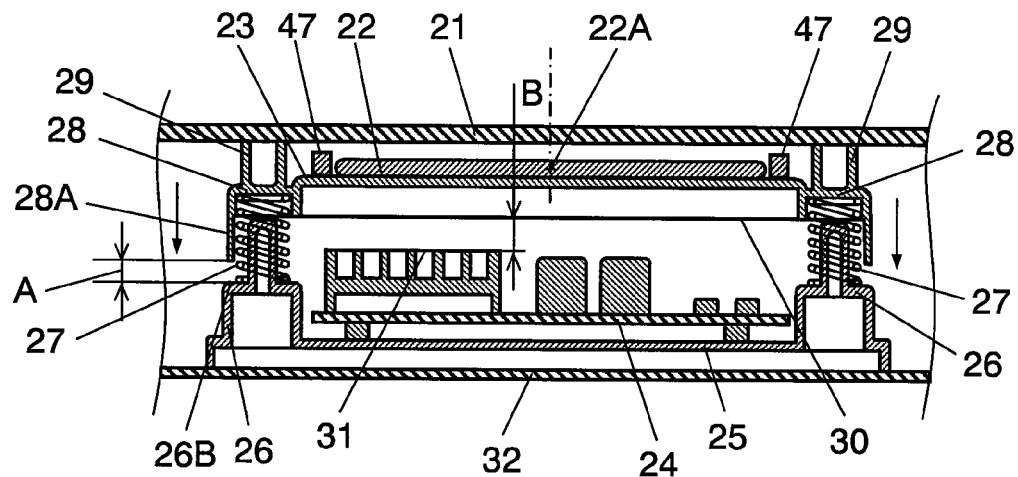
FIG. 1 is a cross sectional view showing the details of an induction heating cooking apparatus in accordance with a first exemplary embodiment of the present invention.

Now in the following, exemplary embodiments of the present invention are described referring to the drawings. Those portions having an identical structure as those of the foregoing embodiments are designated with the same marks or symbols, and detailed description on which portions are eliminated.

First Exemplary Embodiment

Figure 2:
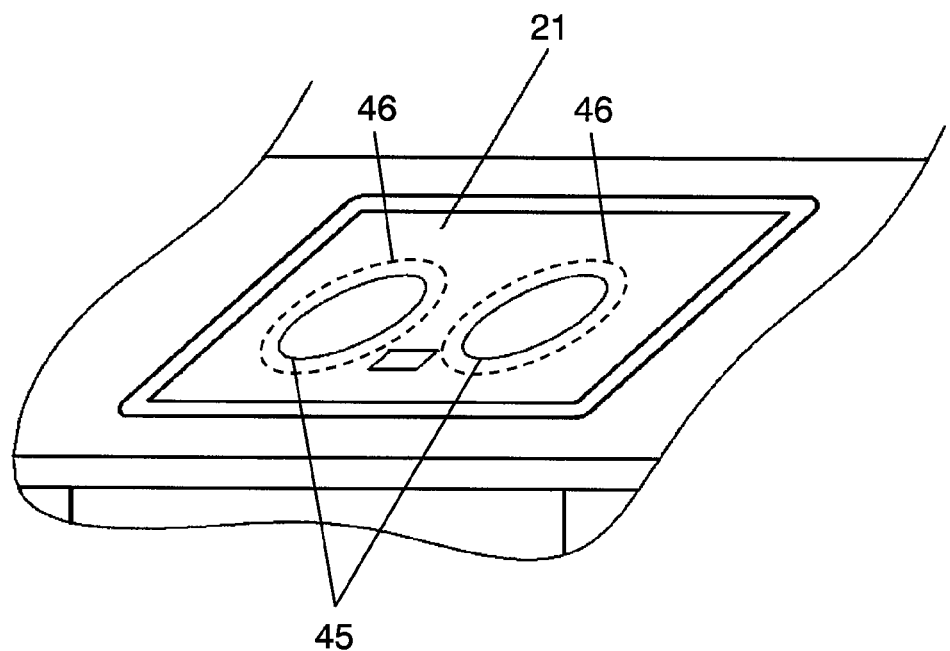
FIG. 2 is a perspective view of the induction heating cooking apparatus shown in FIG. 1.

FIG. 1 and FIG. 2 show a detailed cross sectional view and a perspective view, respectively, of an induction heating cooking apparatus in accordance with a first embodiment of the present invention. Top plate 21, on which a cook pot such as a pan and a kettle are placed, is made of a ceramic plate or the like material. Disposed underneath top plate 21 is coil 22 for generating a line of magnetic force for heating the cook pot by induction heating. The coil is mounted on supporting bed 23 so as coil center 22A coincides with the center of supporting bed 23. Coil 22 is fixedly mounted on supporting bed 23. Underneath supporting bed 23, inverter board 24 (hereinafter referred to as board 24) for driving coil 22 is provided. Namely, supporting bed 23 is locating above board 24, and supports coil 22. Board 24 is held on board holder 25. Board holder 25 is provided with three support bosses 26, each of which is provided with a small column, whose diameter being smaller than that of the base stage, for holding supporting bed 23. Elastic body 27 of a cylindrical shape composed of a coil spring is disposed on a top surface of support boss 26 with the small column inserted in elastic body 27. Elastic body 27 is covered with holding section 28 which is formed integrally with supporting bed 3 and has the bottom end open in a round cylindrical shape. Supporting bed 23 is supported by these components. Although holding section 28 is described to have a round cylindrical shape, it may take the shape of a partial cylinder with some part of the cylinder wall removed, in so far as it can keep holding elastic body 27 properly. Furthermore, the shape is not limited to the round cylinder, it can be a cylinder of polygonal shape.

A plurality of push-up bosses (bosses) 29 are provided on holding section 28. Boss 29 is pushed up by elastic body 27 until the top end reaches the reverse surface of top plate 21. This structure keeps a gap distance between coil 22 and top plate 21 constant. Holding section 28 is further provided with rib 28A, which is a first slide restricting section at the holding section 28 side, protruding towards upper surface 26B of the base stage in support boss 26. Sliding distance A of supporting bed 23 means an up-down gap between support boss 26 and holding section 28 represented by the bottom end of rib 28A. Describing more practically, the sliding distance A is a distance between the bottom end of rib 28A and the surface of support boss, which is the second slide restricting section at the support boss 26 side. The sliding distance A is smaller than the minimum value of a gap B between bottom plane 30 of supporting bed 23 and the top surface 31 of the electronic component. The surface of the second slide restricting section at the support boss 26 side means upper surface 26B of the base stage in support boss 26, which makes contact with the bottom end of rib 28A when elastic body 27 is compressed. Beneath board holder 25, outer casing 32 is provided, which composes the apparatus.

Now in the following, description is made on how coil 22 and board 24 of the above configured cooking apparatus perform.

If a packaged apparatus is dropped by mistake, the apparatus itself is hit by an impact force. In such a situation, as supporting bed 23 for supporting coil 22 is held with an intervening elastic body 27, elastic body 27 is compressed downward, and supporting bed 23 is pushed downward and slides down at the same time. The sliding distance A of supporting bed 23 pushed downward is restricted by rib 28A and upper surface 26B of the base stage in support boss 26 so as it is smaller than a gap B between bottom plane 30 and top surface 31 of the electronic component. Namely, rib 28A works as the slide restricting section at the holding section 28 side, while upper surface 26B of the base stage works as the slide restricting section at the support boss 26 side. Thus, even if supporting bed 23 is pushed down to the lowest point, bottom plane 30 does not hit top surface 31 of the electronic component mounted on board 24. Board 24 would not get damaged, and the entire apparatus itself would not go out of order easily. The number of support boss 26 is not limited to three. Providing three or more support bosses 26 can work similarly.

As described in the above, a slim cooking apparatus provided in accordance with the present embodiment is tough enough to withstand an impact force incurred by a dropping, etc., and exhibits a high reliability.

Top plate 21 may be formed with a light transparent material and mount light emitter 47 on supporting bed 23, so that illuminated circle 46 is projected from down and appears on the top plate, as illustrated in FIG. 1 and FIG. 2. Coil 22 is placed so as it is underneath the inner region of illuminated circle 46. Namely, illuminated circle 46 is the indication of heating area 45. Thereby, a user can easily recognize a place where a cook pot can be efficiently induction-heated, in the same sense as if the user is cooking with gas. The illuminated circle may also serve as an indication whether the heating load is ON, or OFF.

Second Exemplary Embodiment

Figure 3:
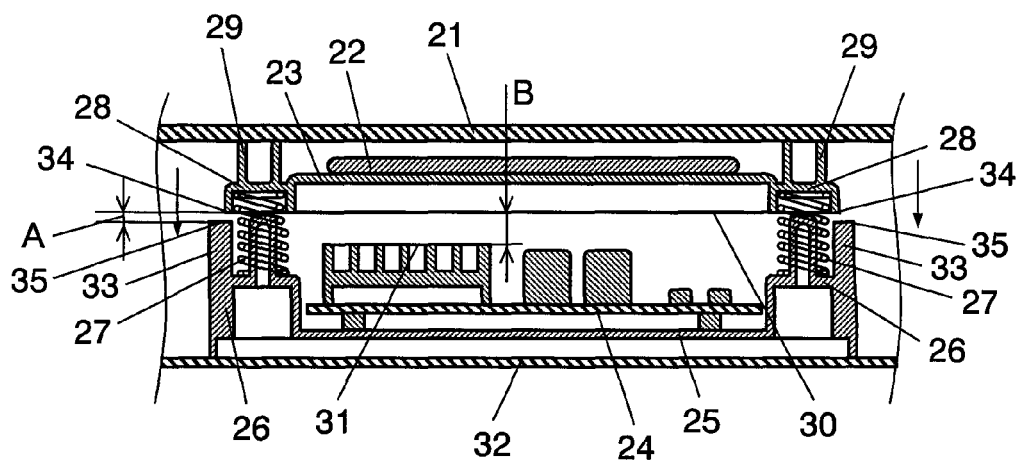
FIG. 3 is a cross sectional view showing the details of an induction heating cooking apparatus in accordance with a second exemplary embodiment of the present invention.
Figure 4:
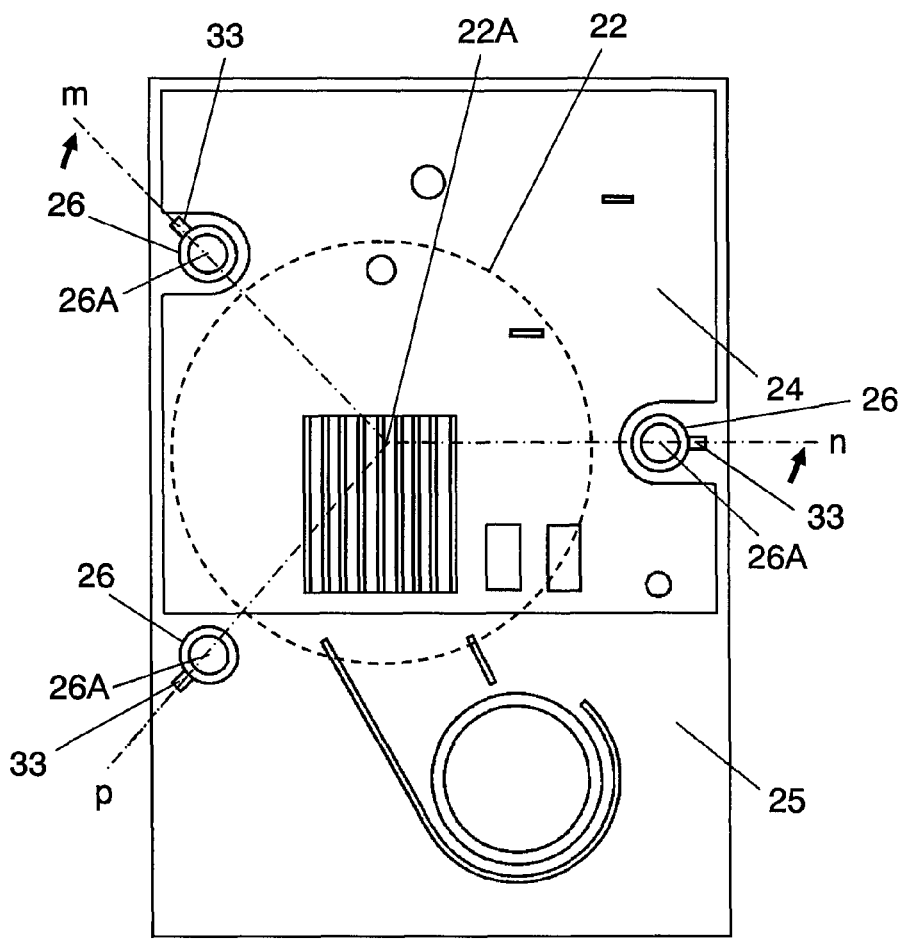
FIG. 4 is a plan view showing the details of a board holder contained in the induction heating cooking apparatus shown in FIG. 3.

FIG. 4 is a plan view showing the details of an induction heating cooking apparatus in accordance with a second embodiment of the present invention. FIG. 3 is a cross sectional view of the cooking apparatus shown in FIG. 4, sectioned along the straight lines m and n, as viewed in the direction of the arrow marks.

Support boss 26 is provided at the outer circumference with rib 33, which is a second slide restricting section protruding towards bottom surface 34 of holding section 28. Rib 33 is preferably provided so that it makes contact with support boss 26 on the respective straight lines m, n and p containing center 22A of coil and center 26A of support boss 26 in the cross sectional view as seen from the top plate 21 side. Rib has a rectangle shape of 2 mm by 1 mm in the cross sectional view, for example. Rib 33 is preferably disposed at the side opposite to coil center 22A with respect to support boss 26. Gap A between bottom surface 34 of cylindrical holding section 28 and top surface 35 of rib 33 is smaller than the minimum value B of a gap between bottom plane 30 of supporting bed 23 and top surface 31 of the electronic component mounted on board 24. For the rest, the basic structure remains the same as that of the first embodiment. Like in the first embodiment, holding section 28 is provided at supporting bed 23, and coupled with elastic body 27.

Next, description is made on how the heating coil and the inverter board perform in the above configured cooking apparatus. If a packaged apparatus is dropped by mistake, the apparatus itself is hit by an impact force. At that time, as supporting bed 23 for supporting coil 22 is held with an intervening elastic body 27, elastic body 27 is compressed downward, and supporting bed 23 is also pushed down at the same time. Like in the first embodiment, the sliding distance A of supporting bed 23 is smaller than the gap B between bottom plane 30 and top surface 31 of the electronic component. Furthermore, since support boss 26 is provided at the outer circumference with rib 33, holding section 28 as the first slide restricting section makes contact with top surface 35 first and supporting bed 23 does not reach top surface 31 of the electronic component even when supporting bed 23 is pushed down. Therefore, board 24 would not get damaged; the entire apparatus does not go out of order easily. Although holding section 28 is described to have a round cylindrical shape, it may be a partial cylinder with some part of the cylindrical wall omitted, in so far as it can keep holding elastic body 27 properly. In this case, it is required that bottom surface 34 of holding section 28 represents the lowest position when bottom surface 34 makes contact with top surface 35 of rib 33.

As viewed from the above, each of three ribs 33 makes a point contact with support boss 26 on respective straight lines m, n and p which contain center 22A of coil 22 and center 26A of supporting boss 26. The cross sectional shape of rib 33 has a point shape. The ribs are provided at the side opposite to coil center 22A with respect to support boss 26. Consequently, respective three ribs 33 regulate elastic bodies 27 in the direction towards center 22A. Thus, supporting bed 23, which includes holding section 28 for holding elastic body 27, is regulated precisely to a targeted place. As a result, center 22A of coil 22 is placed precisely to a right location. Since a cook pot is placed within a heating area printed on top plate 21, a displacement existing between the cook pot and coil 22 is reduced. In a case where illuminated circle 46 is given on the surface of top plate 21 as shown in FIG. 2 of the first embodiment, a displacement between heating area 45 printed on the surface of top plate 21 and illuminated circle 46, which is a heating area designated by a light emitter, can be reduced. This offers a significant advantage. The cross sectional shape of rib 33, as viewed from above, is not limited to a point shape; instead, it can take either a linear shape or an arc of a circle making contact with support boss 26. Either one of the shapes recites the similar advantage.

As described in the above, a slim cooking apparatus provided in accordance with the present embodiment is tough enough to withstand an impact force incurred by dropping, etc., and ensures a high reliability. Furthermore, supporting bed 23 as well as coil 22 disposed on supporting bed 23 can be placed to a targeted location at a high accuracy level.

Third Exemplary Embodiment

Figure 5:
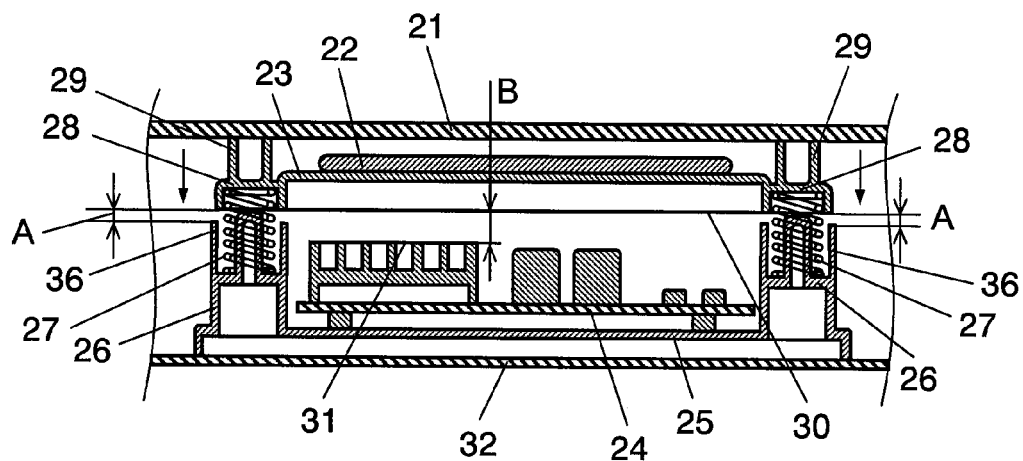
FIG. 5 is a cross sectional view showing the details of an induction heating cooking apparatus in accordance with a third exemplary embodiment of the present invention.
Figure 6:
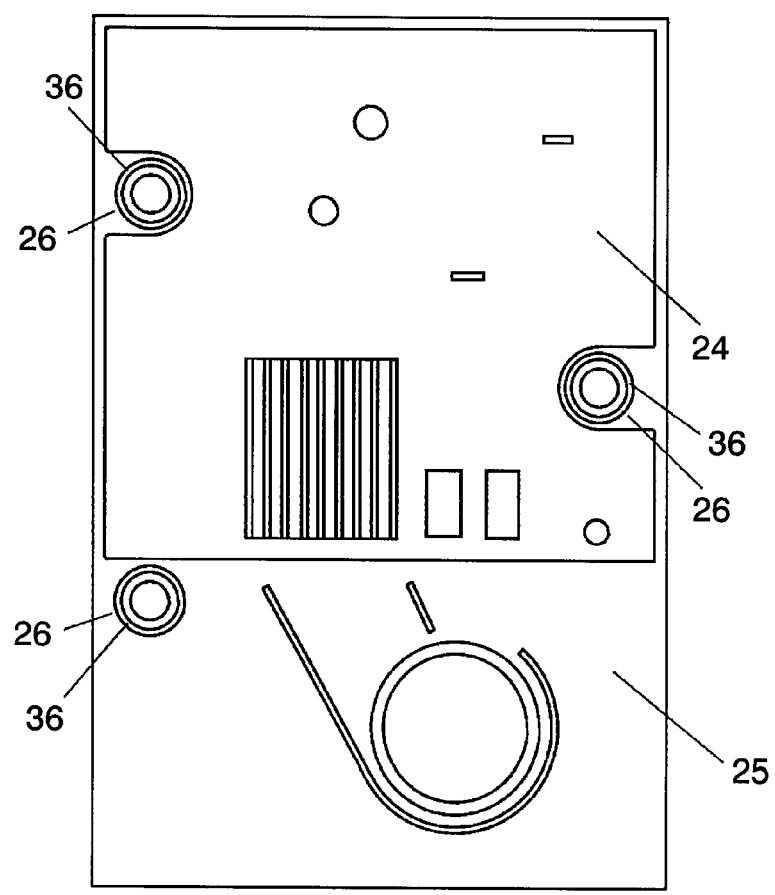
FIG. 6 is a plan view showing the details of a board holder contained in the induction heating cooking apparatus shown in FIG. 5.

FIG. 5 and FIG. 6 show a detailed cross sectional view of an induction heating cooking apparatus in accordance with a third embodiment of the present invention, and a plan view of the board holder, respectively. Support boss 26 is provided with surrounding rib 36, which is a reinforcement rib, disposed at the outer circumference. Namely, rib 36 is a second slide restricting section. For the rest, the basic structure remains the same as that of the first embodiment.

Now, description is made on how the heating coil and the inverter board perform in the above configured cooking apparatus. If a packaged apparatus is dropped by mistake, the apparatus itself is hit by an impact force. At that time, as supporting bed 23 for supporting coil 22 is held with an intervening elastic body 27, elastic body 27 is compressed downward, and supporting bed 23 is also pushed down at the same time. Like in the first embodiment, a sliding distance A of supporting bed 23 is smaller than a gap B between bottom plane 30 and top surface 31 of the electronic component. Since support boss 26 is provided at the outer circumference with surrounding rib 36, the bottom surface of holding section as a first slide restricting section makes contact with top surface 37 of rib 36 first and the supporting bed does not reach the electronic component mounted on board 24 even when supporting bed 22 is pushed down. Furthermore, since rib 36 is formed in a surrounding shape, it has a sufficient strength to withstand a possible impact incurred by holding section 28. Board holder 25 would not get damaged, either. The entire cooking apparatus would not go out of order easily.

Thus, in a slim cooking apparatus provided in accordance with the present embodiment, not only board 24 but also board holder 25 is not get damaged easily by an impact force incurred by dropping. So, the apparatus as a whole exhibits a high reliability.

Fourth Exemplary Embodiment

Figure 7:
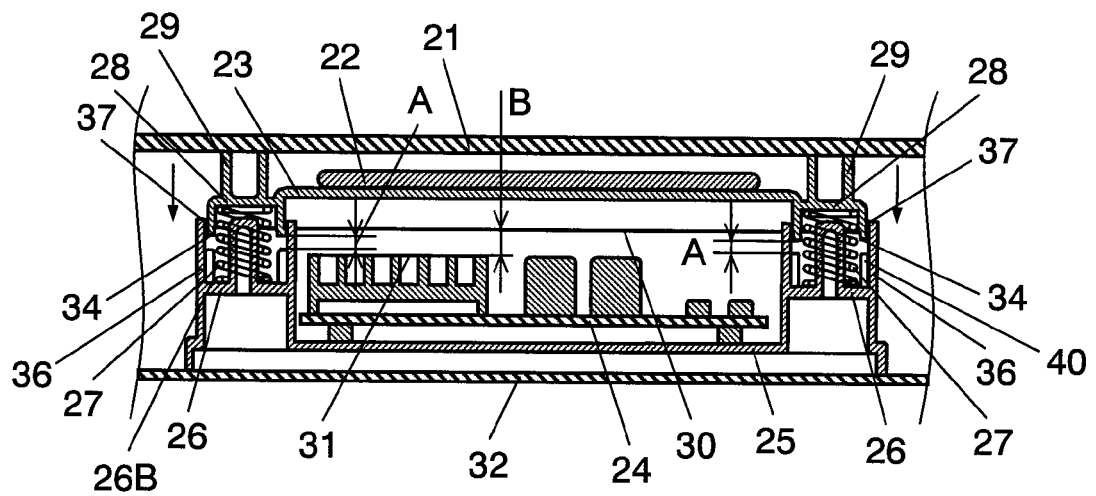
FIG. 7 is a cross sectional view showing the details of an induction heating cooking apparatus in accordance with a fourth exemplary embodiment of the present invention.

FIG. 7 shows a detailed cross sectional view of an induction heating cooking apparatus in accordance with a fourth embodiment of the present invention. Holding section 28 formed in a cylindrical shape is inserted in rib 36 which is a cylindrically-shaped first rib provided at the outer circumference of support boss 26. The cylindrical shape is not limited to an entire cylindrical shape, as described earlier in the first embodiment. Rib 36 is provided so as to stand on upper surface 26B of the base stage. Bottom surface 34 of holding section 28 is positioned to be lower than top surface 37 of rib 36. Rib 40, which is a second rib, is provided at the inner wall surface of rib 36. The top surface of rib 40 and bottom surface 34 of holding section 28 form an up-down gap separated for a sliding distance A. In the present example, holding section 28 works as a first slide restricting section, while rib 40 as a second slide restricting section.

Now, how the heating coil and the inverter board in the above configured induction heating cooking apparatus perform is described. In this structure, holding section 28 of supporting bed 23 is inserted in rib 36 which is formed in a round, cylindrical shape. This brings about an advantage, in addition to that in the third embodiment, that supporting bed 23 is not displaced easily. Even if it is dropped sidewise during packing process, holding section 28 and rib 36 are kept on staying at right position, because they are coupled mechanically. Since supporting bed 23 can not slide down exceeding the sliding distance A, supporting bed 23 does not reach top surface 31 of the electronic components mounted on board 24. Thus, in a slim cooking apparatus provided in accordance with the present embodiment, not only board 24 but also board holder 25 is not get damaged easily by an impact force due to dropping. So, the reliability is high. Furthermore, coil 22 is positioned at right location, thus the reliability of the apparatus as a whole is high.

Although, in the above description, holding section 28 is inserted to the inside of rib 36 for coupling, the coupling may be attained otherwise, viz. by inserting rib 36 to the inside of holding section 28. In this case, slide restricting rib 40 disposed at the inner wall surface of rib 36 of support boss 26 is replaced by a rib 40, which corresponds to rib 40, provided at the outer circumference of rib 36 of support boss 26. Namely, rib 40 is provided surrounding rib 36. In this case, bottom surface 34 of holding section 28 is also positioned to be lower than top surface 37 of rib 36. By doing so, the same advantage is offered.

Fifth Exemplary Embodiment

Figure 8:
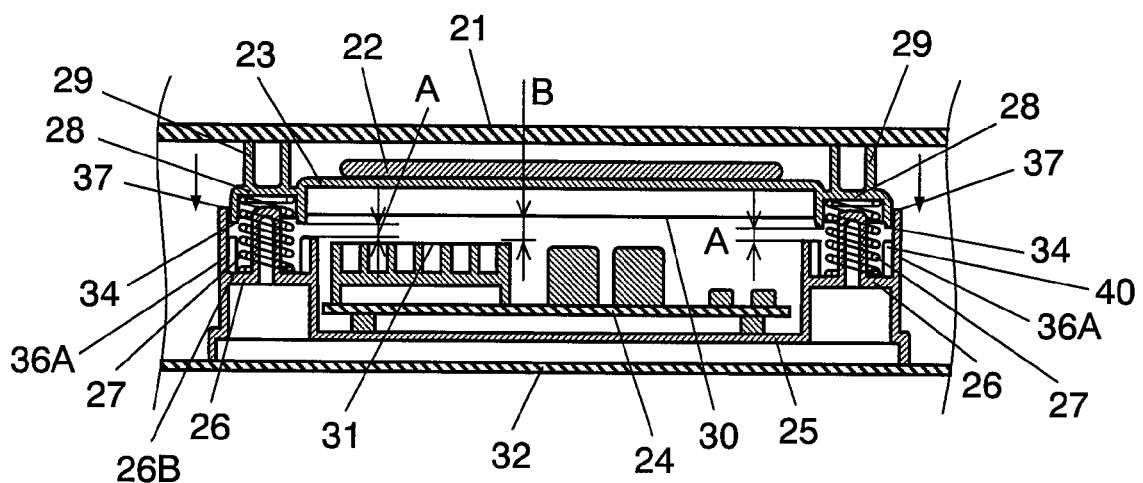
FIG. 8 is a cross sectional view showing the details of an induction heating cooking apparatus in accordance with a fifth exemplary embodiment of the present invention.
Figure 9:
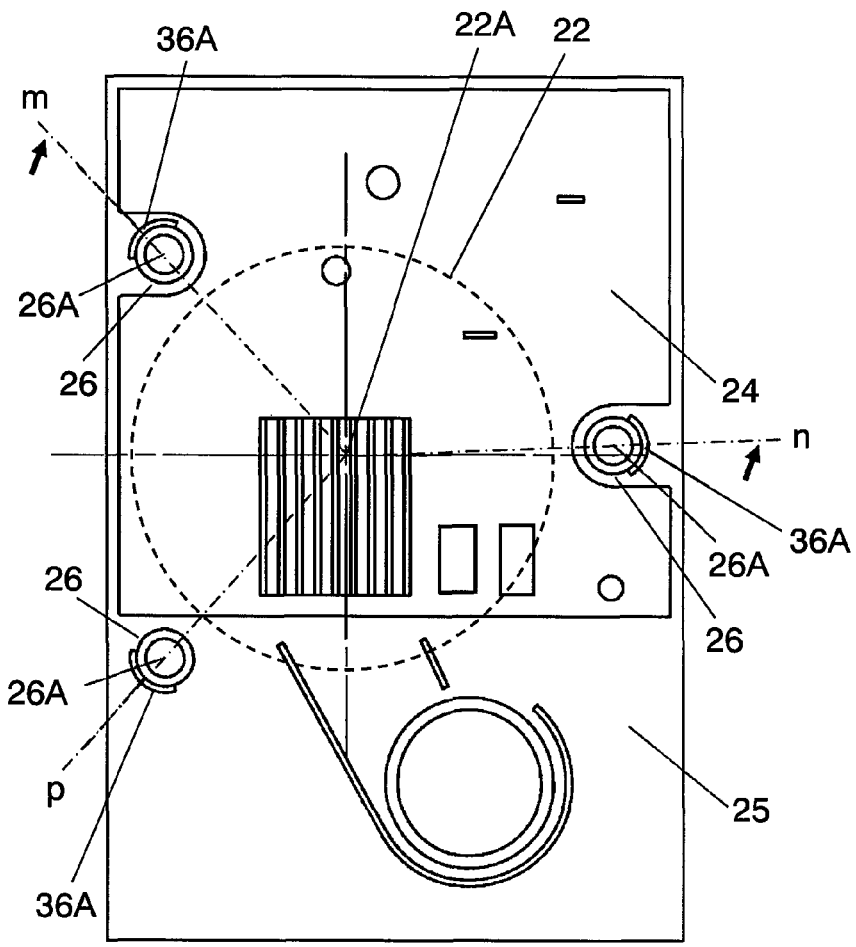
FIG. 9 is a plan view showing the details of a board holder contained in the induction heating cooking apparatus shown in FIG. 8.

FIG. 9 is a plan view showing details of an induction heating cooking apparatus in accordance with a fifth embodiment of the present invention. FIG. 8 is a cross sectional view of the apparatus shown in FIG. 9, sectioned along the straight lines m and n, as viewed in the direction of the arrow marks.

Support boss 26 is provided with Rib 36A which has a shape of a part of a circle in the cross section as viewed from above, standing on upper surface 26B of the base stage in support boss 26 at the outer circumference. Rib 36A makes contact with support boss 26 on the straight lines m, n and p which contain coil center 22A and center 26A of support boss 26. Each of ribs 36A is disposed at the side opposite to coil center 22A with respect to holding section 28. Ribs 36A are located in the outer circumferential area of supporting bed 23. Describing more practically, each of the ribs is formed on the outer circumference of support boss 26, for an angular width approximately 120 degrees of center 26A, to be symmetrical with respect to the straight line containing center 22A and center 26A. In the present example, center 22A coincides with the center of supporting bed 23. For the rest, the basic structure remains the same as that of the fourth embodiment. Namely, holding section 28 is inserted to rib 36A at the support boss 26 side, and bottom surface 34 of holding section 28 is placed to be lower than top surface 37 of rib 36A. In the present example, holding section 28 works as a first slide restricting section, while rib 40, which is provided at the center 26A side of rib 36A, works as a second slide restricting section.

Ribs 36A are formed in a shape of a part of a circle in the cross section as viewed from above, making contact with support boss 26 on the straight lines m, n and p which contain center 22A and center 26A. These ribs are disposed at the side opposite to center 22A. Therefore, the present example recites the same advantage as that in the fourth embodiment. Even if supporting bed 23 is given a stress by a lead wire, for example, supporting bed 23 is not dislocated easily and is kept on staying precisely at right stance; in the same manner as described in the fourth embodiment. Namely, since rib 36A is formed in the shape of a part of a circle with respect to center 26A in the cross section as viewed from above, elastic body 7 causes less amount of displacement than in the second embodiment.

Thus, in a slim cooking apparatus provided in accordance with the present embodiment, not only board 24 but also board holder 25 is not damaged easily by an impact caused as the result of dropping. Furthermore, coil 22 is surely kept at right position. So, the cooking apparatus as a whole exhibits a high reliability.

In the above description, holding section 28 is inserted in support boss 26 at the center 26A side of rib 36A. Instead, as shown in the cross sectional view of FIG. 10, rib 36B may be provided at a location that is at least inner than center 26A of support boss 26 as observed in the direction towards center 22A of coil 22; and insert rib 36B in holding section 28 for coupling. Namely, rib 36B formed in a point shape, a linear shape or a part of a circle shape, which makes contact with the outer circumference of support boss 26 on the straight line containing center 22A of coil 22 and center 26A of support boss 26, may be provided at the same side as center 22A of coil 22. In this case, the inner bottom surface of holding section 28 works as a first slide restricting section, while rib 36B as a second slide restricting section. Bottom surface 34 of holding section 28 is also positioned to be lower than top surface 37 of rib 36B. This structure also offers the same advantage.

Instead of rib 40, rib 28A may be provided, like in the first embodiment, at holding section 28; here, upper surface 26B of the base stage in support boss 26 works as a second slide restricting section, while rib 28A as a first slide restricting section. This configuration is identical to the structure of first embodiment plus rib 36B. These structures may be applied to the fourth embodiment, with the exception of rib 40.

Sixth Exemplary Embodiment

Figure 11:
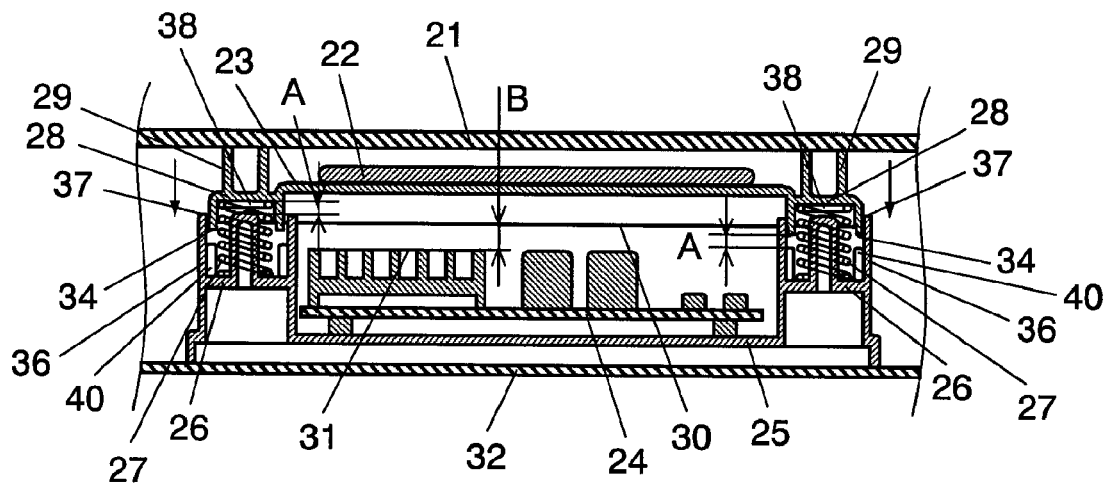
FIG. 11 is a cross sectional view showing the details of an induction heating cooking apparatus in accordance with a sixth exemplary embodiment of the present invention.
Figure 12:
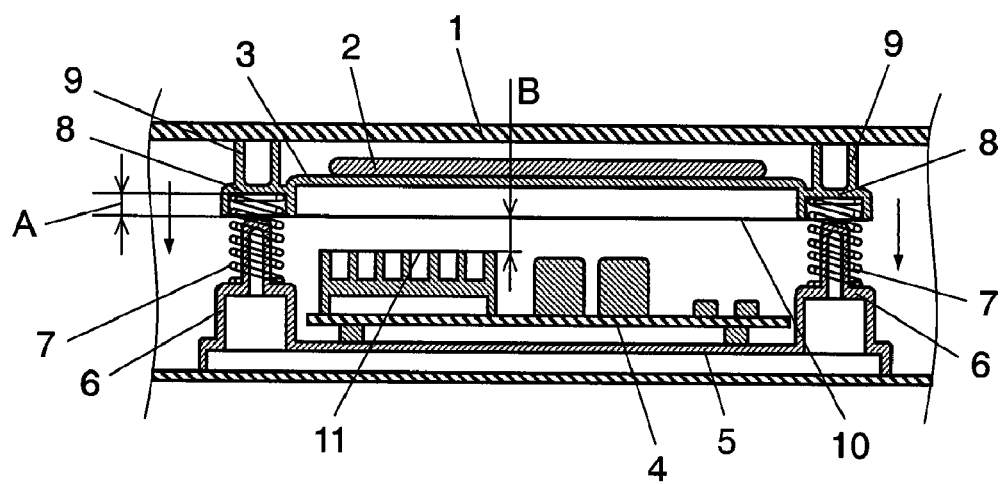
FIG. 12 is a cross sectional view showing the details of a conventional induction heating cooking apparatus.

FIG. 11 is a cross sectional view showing the details of an induction heating cooking apparatus in accordance with a sixth embodiment of the present invention. In the inside of holding section 28 of supporting bed 23, cushion member 38 made of a shock-absorbing foamed material is provided; it is attached on the top surface of rib 40 and the opposing surface forming an up-down gap. Rib 40 is a second slide restricting section of support boss 26 locating underneath, while bottom surface 34 of holding section 28 is a first slide restricting section. For the rest, the basic structure remains the same as that of the fourth embodiment.

If a packaged cooking apparatus is dropped by mistake, the cooking apparatus itself is hit by an impact force. At that time, as supporting bed 23 for supporting coil 22 is held with an intervening elastic body 27, elastic body 27 is compressed downward, and supporting bed 23 is also pushed down at the same time. Since there is cushion member 38 attached in the inside of holding section 28 in the present embodiment, a substantial portion of impact force generated when colliding onto support boss 26 is absorbed, in addition to the advantage recited in the fourth embodiment. A burden on board holder 25 is alleviated remarkably, and the cooking apparatus is not broken easily.

Figure 10:
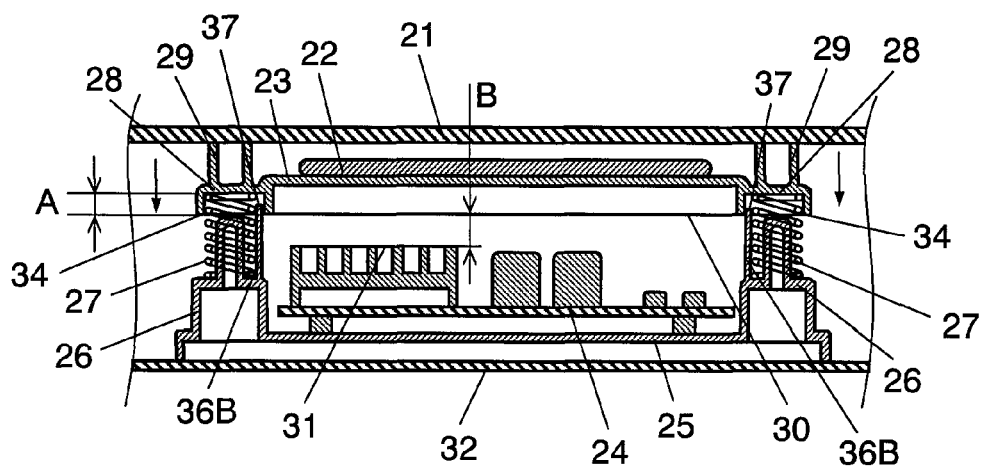
FIG. 10 is a cross sectional view showing the details of another induction heating cooking apparatus in accordance with the fifth exemplary embodiment.

Although cushion member 38 is provided inside of holding section 28, the cushion member may be disposed on the top surface of rib 40, which is a second slide restricting section at support boss 26. Cushion member 38 may of course be provided on both places. Furthermore, it may be provided on top surface 35 of rib 33 or bottom surface 34 of holding section 28 of the second embodiment. In the structure of the fifth embodiment as shown in FIG. 10, cushion member 38 may be attached on the top surface of rib 36B or the inner surface of holding section 28 at an area opposing to the top surface of rib 36B. As described in the above, the impact can be softened by attaching cushion member 38 on either one of the opposing surfaces at a first slide restricting section and a second slide restricting section, viz. the surfaces which collide against each other when supporting bed 23 is lowered.

In a slim cooking apparatus provided in accordance with the present embodiment, not only board 24 but also board holder 25 is not damaged easily by a dropped shock. So, the cooking apparatus as a whole would exhibit a high reliability.

It is to be noted that the scope of present invention is not limited by the above descriptions made on the exemplary embodiments.

INDUSTRIAL APPLICABILITY

Even when packaged induction heating cooking apparatus in accordance with the present invention is accidentally dropped, a supporting bed which holds a heating coil never hit directly electronic components mounted on an inverter board. Thus, the apparatus as a whole exhibits a high reliability. Furthermore, since the heating coil is not displaced easily, it helps realizing a high assembling efficiency and well-stabilized performance. Such induction heating apparatus can be used also for the purpose of realizing a compact and slim cooking device.

The invention claimed is:

1. An induction heating cooking apparatus comprising:
   a top plate on which a cook pot is placed;
   a coil configured to heat the cook pot by means of induction heating;
   an inverter board mounted with components to drive the coil;
   a supporting bed configured to support the coil provided with a push-up boss on an upper surface, the supporting bed being disposed above the inverter board, and being pushed upward to the top plate via the push-up boss;
   a board holder provided with three or more support bosses configured to hold the supporting bed, the board holder being configured to hold the inverter board;
   elastic bodies, each intervening between the supporting bed and each of the support bosses;
   holding sections of cylindrical shape as first slide restricting sections provided at the supporting bed, each of the holding sections being coupled with one of the elastic bodies; and
   first ribs as second slide restricting sections, each provided at each of the support bosses, each of the first ribs protruding towards a bottom surface of each of the holding sections and configured to restrict a sliding distance of the supporting bed by making contact with each of the holding sections so that the sliding distance of the supporting bed is smaller than a minimum value of a gap between a bottom plane of the supporting bed and a top surface of the components,
   wherein a height of each of the elastic bodies is greater than a sum of a height of each of the first ribs and a height of each of the holding sections.

2. The induction heating cooking apparatus according to claim 1,
   wherein each of the support bosses is further provided with an upper surface of a base stage and a second rib of cylindrical shape disposed standing on the upper surface of the base stage, the second rib of cylindrical shape configured to couple with each of the holding sections.

3. The induction heating cooking apparatus according to claim 1,
   wherein each of the support bosses is further provided with an upper surface of a base stage and each of the first ribs is provided at an outer circumference of one of the support bosses and stands on the upper surface of the base stage at a side opposite to a center of the coil with respect to each of the holding sections.

4. The induction heating cooking apparatus according to claim 1,
   wherein each of the first ribs, in a cross section as viewed from the top plate, is disposed so that each of the first ribs makes contact with one of the support bosses on a straight line which contains a center of the coil and a center of one of the support bosses at a side opposite to the center of the coil.

5. The induction heating cooking apparatus according to claim 4,
   wherein each of the first ribs takes a shape of one of a point form, a linear form and a part of a circle form in the cross section as viewed from the top plate.

6. The induction heating cooking apparatus according to claim 1,
   wherein each of the first ribs is provided in a cylindrical shape.

7. The induction heating cooking apparatus according to claim 1,
   wherein each of the support bosses is provided with a second rib of cylindrical shape coupling with one of the holding sections, and the each of the first ribs is disposed at an outer circumference of the second rib.

8. The induction heating cooking apparatus according to claim 1,
   wherein each of the support bosses is provided with an outer circumferential rib at a side opposite to a center of the coil with respect to one of the holding sections, and each of the first ribs is disposed at a central side of the outer circumferential rib.

9. The induction heating cooking apparatus according to claim 8,
   wherein the outer circumferential rib, in a cross sectional view as seen from above, is formed in a shape of a part of a circle facing towards a center of one of the support bosses.

10. The induction heating cooking apparatus according to claim 1,
    wherein each of the first ribs is inserted to one of the holding sections, and is disposed at a location on an inner circumference at least closer to a center of the coil than a center of respective one of the support bosses.

11. The induction heating cooking apparatus according to claim 1,
    wherein the sliding distance of the supporting bed is a distance between a bottom end of each of the holding sections and a top surface of each of the first ribs.

* * * * *

UNITED STATES PATENT AND TRADEMARK OFFICE
CERTIFICATE OF CORRECTION

PATENT NO. : 7,777,163 B2 Page 1 of 1
APPLICATION NO. : 11/571359
DATED : August 17, 2010
INVENTOR(S) : Hosoi et al.

It is certified that error appears in the above-identified patent and that said Letters Patent is hereby corrected as shown below:

In column 4, line 62, please insert the number --33-- after the word -Rib- and before the word -has-, In column 6, line 15, please insert the number --28-- after the word -section-.

Signed and Sealed this

Thirtieth Day of November, 2010

David J. Kappos
*Director of the United States Patent and Trademark Office*